US012355150B2

(12) United States Patent
Svensson et al.

(10) Patent No.: US 12,355,150 B2
(45) Date of Patent: Jul. 8, 2025

(54) NOTCH ANTENNA STRUCTURE

(71) Applicant: SAAB AB, Linköping (SE)

(72) Inventors: Bengt Svensson, Mölndal (SE); Sigrid Hammarqvist, Fjärås (SE); Peter Tisell, Mölnlycke (SE); Erik Schloenzig, Kungälv (SE); Theodor Hassiakis, Hisings Backa (SE)

(73) Assignee: SAAB AB, Linköping (SE)

( * ) Notice: Subject to any disclaimer, the term of this patent is extended or adjusted under 35 U.S.C. 154(b) by 198 days.

(21) Appl. No.: 18/042,224

(22) PCT Filed: Aug. 23, 2021

(86) PCT No.: PCT/SE2021/050819
§ 371 (c)(1),
(2) Date: Feb. 20, 2023

(87) PCT Pub. No.: WO2022/045947
PCT Pub. Date: Mar. 3, 2022

(65) Prior Publication Data

US 2023/0318191 A1 Oct. 5, 2023

(30) Foreign Application Priority Data

Aug. 25, 2020 (SE) .................................... 2000146-7

(51) Int. Cl.
*H01Q 13/08* (2006.01)
*H01Q 21/00* (2006.01)
*H01Q 21/06* (2006.01)

(52) U.S. Cl.
CPC ....... *H01Q 13/085* (2013.01); *H01Q 21/0025* (2013.01); *H01Q 21/0087* (2013.01); *H01Q 21/064* (2013.01)

(58) Field of Classification Search
CPC ............. H01Q 13/085; H01Q 21/0025; H01Q 21/0087; H01Q 21/064
See application file for complete search history.

(56) References Cited

U.S. PATENT DOCUMENTS 5,081,466 A * 1/1992 Bitter, Jr. ............. H01Q 13/085 343/767
5,227,808 A * 7/1993 Davis ................... H01Q 13/085 343/915

(Continued)

FOREIGN PATENT DOCUMENTS

CN 108736147 A 11/2018
CN 110994160 A 4/2020

OTHER PUBLICATIONS

International Search Report and Written Opinion mailed Sep. 3, 2021 for International Application No. PCT/SE2021/050819, 13 pages.

(Continued)

*Primary Examiner* — Hai V Tran
(74) *Attorney, Agent, or Firm* — Sage Patent Group

(57) ABSTRACT

The present disclosure relates to a notch antenna structure including a plurality of notch antenna elements arranged in at least a first row (R). Each notch antenna element includes a base portion having first and second opposing surfaces, a first electrically conductive body and an adjacent second electrically conductive body, the electrically conductive bodies extending vertically from the first surface, forming an integral structure, a tapering gap between the two electrically conductive bodies. The notch antenna structure includes a bottom plane for receiving the second surface of the plurality of notch antenna elements and the first electrically conductive body includes a leg portion having a feed arrangement proximate to the tapering gap, the feed arrangement including a feed point.

12 Claims, 5 Drawing Sheets

(56) References Cited

U.S. PATENT DOCUMENTS

| | | | | |
|---|---|---|---|---|
| 5,557,291 | A * | 9/1996 | Chu | H01Q 13/085 343/768 |
| 6,127,984 | A | 10/2000 | Klebe et al. | |
| 8,350,773 | B1 | 1/2013 | Kindt | |
| 10,193,237 | B1 | 1/2019 | Brigham | |
| 10,886,625 | B2 * | 1/2021 | Franzini | H01Q 5/335 |
| 2002/0180655 | A1 | 12/2002 | Mohuchy et al. | |
| 2009/0322636 | A1 | 12/2009 | Brigham et al. | |
| 2014/0085156 | A1 | 3/2014 | Gebretnsae et al. | |
| 2017/0025767 | A1 * | 1/2017 | Elsallal | H01Q 3/30 |
| 2018/0069322 | A1 | 3/2018 | Vouvakis et al. | |
| 2020/0076090 | A1 | 3/2020 | Franzini et al. | |

OTHER PUBLICATIONS

Extended European Search Report mailed Aug. 8, 2024 for European Patent Application No. 21862193.6, 8 pages.

Office Action mailed Apr. 24, 2025 for United Arab Emirates Patent Application No. P60000402/2023, 8 pages.

* cited by examiner

NOTCH ANTENNA STRUCTURE

CROSS-REFERENCE TO RELATED APPLICATIONS

This application is a 35 U.S.C § 371 national stage application for International Application No. PCT/SE2021/050819, entitled "A NOTCH ANTENNA STRUCTURE", filed on Aug. 23, 2021, which claims priority to Swedish Patent Publication No. 2000146-7, filed on Aug. 25, 2020, the disclosures and contents of which are hereby incorporated by reference in their entireties.

TECHNICAL FIELD

The present disclosure relates to a notch antenna structure comprising a plurality of notch antenna elements.

BACKGROUND

Antennas are known in the art and used to convert radio frequency fields into alternating current or converting alternating current in to propagating waves at radio frequencies. Antenna arrays with a set of two or more antenna elements are commonly used in various applications to combine or process signals from the antenna array in order to achieve improved performance over that of a single antenna. For instance, they are able to match a radiation pattern to a desired coverage area, changing radiation pattern, adapting to changing signal conditions and some configurations can cover a large bandwidth. Antenna arrays can be described by their radiation patterns and by the type of antenna elements in the system.

A common type of antenna element utilized in antenna arrays is the notch antenna element, also known as a tapered-slot or Vivaldi antenna element. Typically, the notch antenna element have a radiating part starting with a slot-line which widens in one direction in a tapered notch. The notch antenna element is usually fed through a radio frequency (RF) connector.

Conventionally, the manufacturing and assembly of notch antenna elements for notch antenna arrays can be costly and complicated, especially for planar notch antenna elements. The feed arrangement and the assembly of the elements to an antenna ground plane usually results in a more costly and complex manufacturing process with low flexibility. Further, when manufacturing a large array of notch antenna elements, each notch antenna element is separately mounted to the antenna ground plane which results in a more timely and costly manufacturing.

Accordingly, there is room for notch antenna structures for notch antenna arrays in the present art to explore the domain of providing an improved notch antenna structure with simplicity in design, assembly and manufacturing compared to previous solutions. More specifically, there is a need in the present art for an improved notch antenna structure that can utilize a more flexible and simple feed arrangement, and where the notch antenna elements of the structure can be assembled to an array or sub-array in a convenient and flexible manner.

Even though some currently known solutions work well in some situations it would be desirable to provide a notch antenna structure that fulfils requirements related to improving the cost-efficiency, assembly and manufacturing of notch antenna structures.

SUMMARY

It is therefore an object of the present disclosure to provide a notch antenna structure and a vehicle comprising such a notch antenna structure to mitigate, alleviate or eliminate one or more of the above-identified deficiencies and disadvantages.

This object is achieved by means of a notch antenna structure and a vehicle comprising such a notch antenna structure as defined in the appended claims.

The present disclosure is at least partly based on the insight that by providing a notch antenna structure having an integral antenna element structure that can utilize a flexible feeding arrangement the manufacturing and assembly of the notch antenna structure will be more convenient and cost-efficient.

The present disclosure provides a notch antenna structure comprising a plurality of notch antenna elements arranged in at least a first row. Each notch antenna element comprising a base portion having first and second opposing surfaces, a first electrically conductive body and an adjacent second electrically conductive body. The electrically conductive bodies extend vertically from the first surface of the base portion. Thus, the antenna elements and the base portion form a common integral structure. Each notch antenna element comprise a tapering gap between the two electrically conductive bodies. The notch antenna structure comprises a bottom plane for receiving the second surface of the plurality of notch antenna elements and the first electrically conductive body comprises a leg portion having a feed arrangement proximate to the tapering gap, the feed arrangement comprising a feed point.

A benefit of the notch antenna structure according to the present disclosure is that the integral structure of each of the plurality of notch antenna elements is convenient and fast to manufacture and assemble to a bottom plane e.g. a PCB, ground plane or electronic module. Another benefit of the notch antenna structure according to the present disclosure is that the connection with the feed point of each antenna element is located at the leg portion of the antenna element resulting in a less complicated feed arrangement. Thus, the notch antenna structure according to the present disclosure provide an improved and more flexible feeding interface and a design that is more efficiently arranged to manufacture and assemble a large number of antenna elements arranged in at least one row.

Each notch antenna element may be joined at the base portion to at least one other notch antenna element so to form a common integral row of notch antenna elements.

Accordingly, an integral structure of a plurality of notch antenna elements arranged in a row can efficiently be divided into a plurality of rows to be sub-arrays or a plurality of individual antenna elements. Each plurality of the notch antenna elements may be arranged in a row sharing a common base portion which allows for easy assembly to the bottom plane. A row of antenna elements (which then is one single component) can beneficially be assembled to the bottom plane by mounting the second surface of the base portion to the bottom plane or easily cut in to separate antenna elements. Thus, by manufacturing a plurality of antenna elements as one component (i.e. having a common base portion) the manufacturing process is improved. Also, this allows for flexibility since the common integral row may be mounted as one piece to the bottom plane or can be divided in to individual antenna elements and be mounted to the bottom plane.

The base portion of the notch antenna elements may comprise a through hole via which the feed point is accessible. This allows for feeding of the feed point of antenna element from the bottom plane of the notch antenna structure. Resulting in a more space-efficient notch antenna structure.

The leg portion of the notch antenna structure may be a first leg portion and the first electrically conductive body may comprise a second leg portion integral with the first surface of the base portion, and wherein the first leg portion is separated from the base portion by a defined distance. A benefit of having the first leg portion separated from the base portion by a defined distance is that it allows for flexibility of type of feeding arrangement. The feeding arrangement may comprise a coaxial connector fastened to the feed point, or the feeding arrangement may comprise an open-ended transmission line essentially λ/4 away from the feed point or the feeding arrangement may comprise means for capacitive coupling.

Each notch antenna element of the notch antenna structure may form a three-dimensional, 3D, metal structure having a length along a first direction, a width in a second direction, and a thickness in a third direction. The first, second and third directions may be orthogonal to each other. Further, the bottom plane may comprise a first surface having a recess extending along the second direction, the recess being arranged to receive a row of the plurality of notch antenna elements. Accordingly, a row of notch antenna elements may beneficially be mounted to the bottom plane by only inserting the second surface of the base portion in the recess resulting in an improved assembly, particularly if an antenna array with a large number of elements are to be manufactured.

The 3D metal structure may be a solid metal structure i.e. an all metal structure. By having all-metal elements there is a low loss in the notch antenna structure. Further, the design combined with the all-metal elements may beneficially draw excess heat from the substrate. Accordingly, the risk of overheating of the antenna array and its electronics is decreased.

Further, each of the first and second electrically conductive bodies of each antenna element may comprise a circumferentially enclosed cavity at an interior portion. The circumferentially enclosed cavity in the interior portion of the conductive bodies of the antenna elements results in a lower weight of the antenna element structure and consequently a less expensive manufacturing.

Also, each of the first and second electrically conductive bodies may extend from a lower portion to a tapered upper portion, wherein the cavity follow an outer contour of at least the tapered upper portion of each of the conductive bodies. Thus, the cavity can be large enough to provide a significant weight reduction of the antenna elements without hampering the performance.

Further, the feed arrangement may comprise a connector integral with the leg portion. The connector may be a coaxial connector.

Furthermore, the tapering gap may be a step-wise tapering gap or the tapering gap may be a continuously tapering gap.

There is further provided a vehicle comprising the notch antenna structure as disclosed herein.

BRIEF DESCRIPTION OF THE DRAWINGS

Further objects, features and advantages of embodiments of the disclosure will appear from the following detailed description, reference being made to the accompanying drawings, in which.

DETAILED DESCRIPTION

Figure 1:
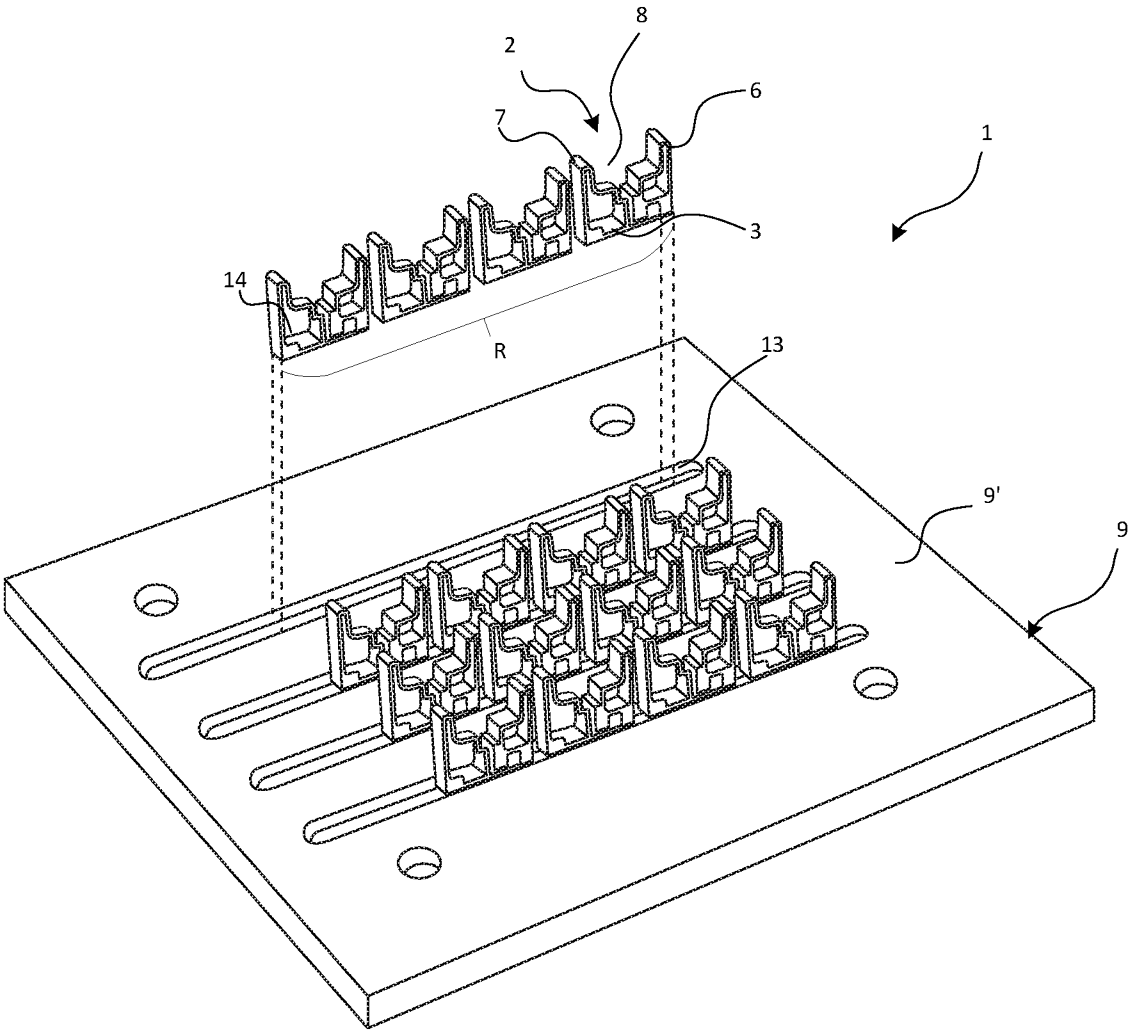
FIG. 1 illustrates a notch antenna structure from an objective view in accordance with an embodiment of the disclosure where one row of antenna elements is exploded

In the following detailed description, some embodiments of the present disclosure will be described. However, it is to be understood that features of the different embodiments are exchangeable between the embodiments and may be combined in different ways, unless anything else is specifically indicated. Even though in the following description, numerous specific details are set forth to provide a more thorough understanding of the provided notch antenna structure and a vehicle comprising such a notch antenna structure, it will be apparent to one skilled in the art that the antenna structure may be realized without these details. In other instances, well known constructions or functions are not described in detail, so as not to obscure the present disclosure.

In the following description of example embodiments, the same reference numerals denote the same or similar components.

The term "antenna structure" or "array antenna" or "array of antenna elements" or "antenna array" refers to a set of multiple connected antennas which work together as a single antenna. In this disclosure the term "antenna array" refers to at least two antenna elements. The term "RF" refers to radio frequency which is an electromagnetic wave having a frequency. An antenna array/antenna structure may be coupled to a feeding system.

The term "tapering" refers to both continuously tapering and stepped tapering arrangements.

The term "connector" or "RF connector" refers to a component which may for example connect coaxial cables, which transmit and receive radio frequency signals to/from the associated antenna element.

The term "integral" refers to a unitary or one-piece structure made of a single material and does not include structures formed by e.g. welding, soldering or gluing several pieces together. Thus, the term "integral structure" refers to that the structure is a monolithic structure. Accordingly, the term "integral" may be interchanged with the term "monolithic".

The term "tapering gap" or "tapering slot" refers to a cavity within the antenna element that guides electromagnetic waves from the cavity to be emitted from the antenna element. The cavity may be filled with air.

Figure 2:
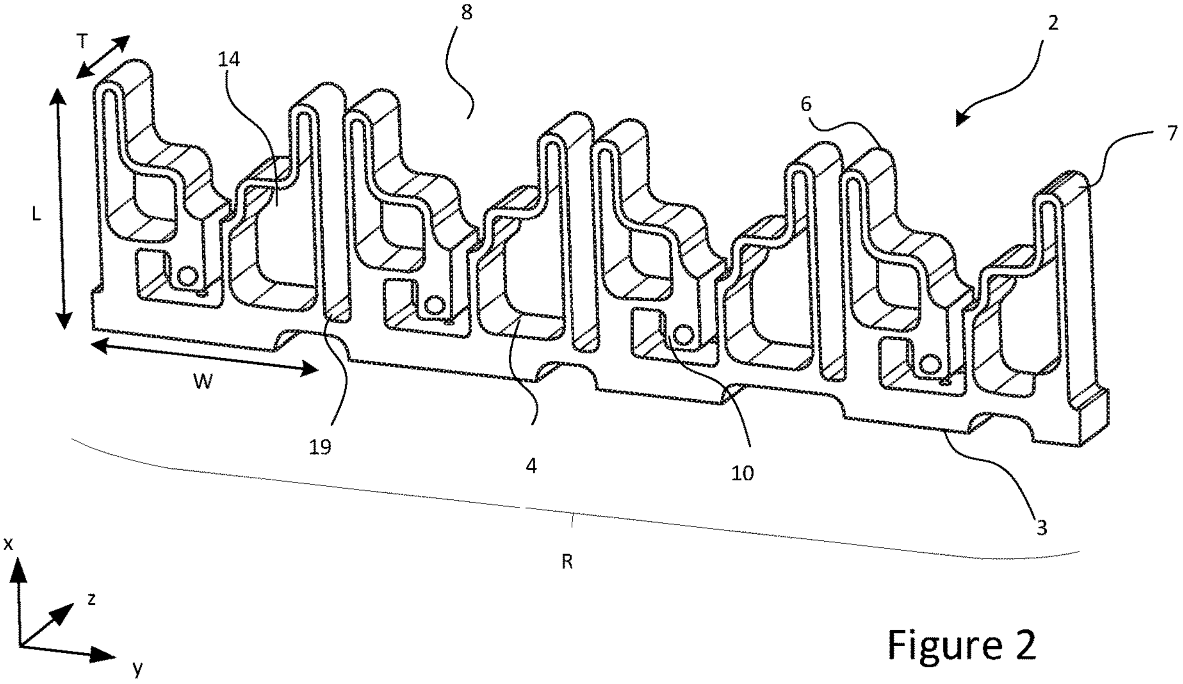
FIG. 2 illustrates an objective row of antenna elements sharing a common base portion in accordance with an embodiment of the disclosure
Figure 3:
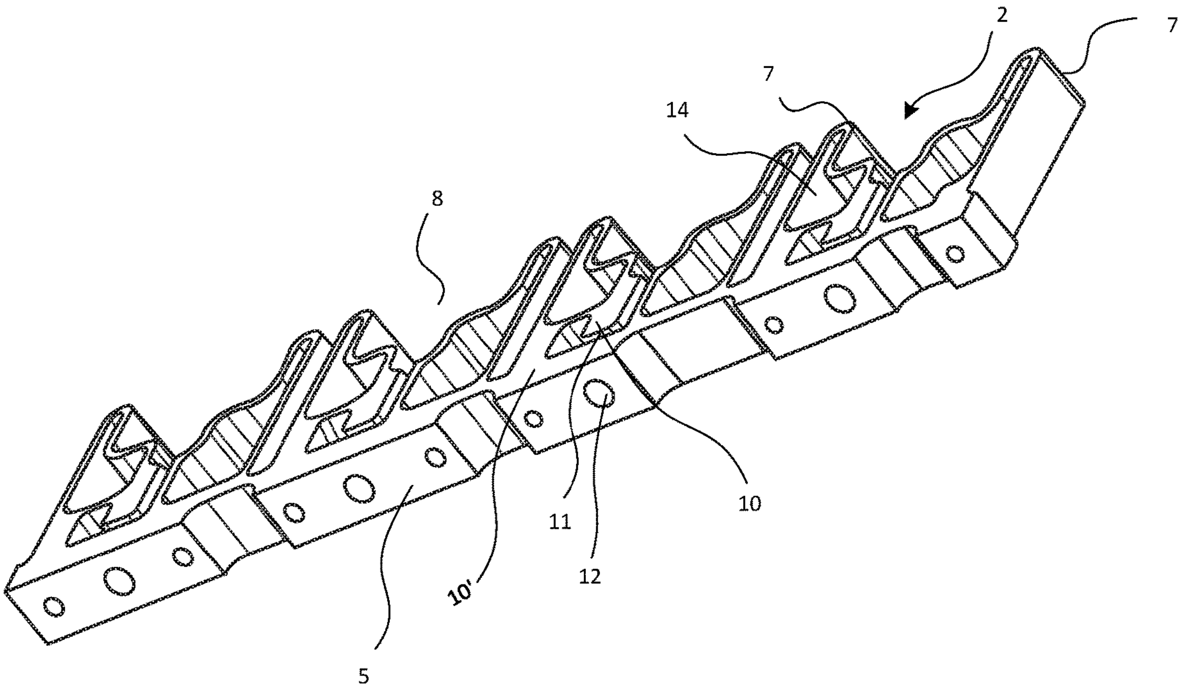
FIG. 3 illustrates the antenna elements of FIG. 2 viewed from the second surface of the base portion

FIG. 1 illustrates an objective view of a notch antenna structure 1 comprising a plurality of notch antenna elements 2 arranged in at least a first row R, each notch antenna element 2 comprising: a base portion 3 having first and second opposing surfaces (not shown, see e.g. FIGS. 2 and 3). Further, the notch antenna structure 1 comprises a first electrically conductive body 6 and an adjacent second electrically conductive body 7, the electrically conductive bodies 6, 7 extending vertically from the first surface 4, forming an integral structure. Further, there is a tapering gap 8 between the two electrically conductive bodies 6, 7 and the notch antenna structure comprises a bottom plane 9 for receiving the second surface (not shown, see e.g. FIG. 3) of the plurality of notch antenna elements 2. The first electrically conductive body 6 comprises a leg portion 10 (see e.g. FIGS. 4*a* and 4*b* for a detailed view of the leg portion) having a feed arrangement proximate to the tapering gap 8, the feed arrangement comprising a feed point (see e.g. FIG. 4*a*). The tapering gap 8 correspond to a radiating part, as seen in the FIGS. 1-4, the tapering gap 8 extends to the base portion 3 of each antenna element 2 as a slotline.

In FIG. 1, there is shown 4 rows of antenna elements 2, each row having 4 antenna elements 2. However, the notch antenna structure 1 may have more or less than 4 rows R and more or less than 4 antenna elements for each row R. Further, one row R of the antenna elements 2 in FIG. 1 is exploded showing how the bottom plane 9 comprises an area for receiving a row of antenna elements 2. According to some embodiments, the area on the bottom plane 9 is a substantially flat surface. It should be noted that the antenna elements 2 in FIG. 1 are not joined to each other. Thus, each row R of antenna elements 2 as seen in FIG. 1 comprises 4 separate antenna elements 2.

The bottom plane 9 may be an antenna ground plane or a substrate with an electrically conductive pattern and electronics. Electronics may be e.g. amplifiers, phase shifters, vector modulators etc. Accordingly, the bottom plane 9 may be a printed circuit board, PCB.

A benefit of the notch antenna structure 1 as shown in FIG. 1 is that the integral structure of each of the plurality of notch antenna elements 2 is convenient and fast to manufacture and assemble to a bottom plane 9 e.g. a PCB, ground plane or electronic module.

FIG. 2 illustrates an objective view of a row of antenna elements 2. As shown in FIG. 2 (FIG. 3 also illustrates this from another view) each notch antenna element 2 is joined at the base portion 3 to at least one other notch antenna element 2 so to form a common integral row R of notch antenna elements 2. Thus, a plurality of antenna elements 2 can be assembled to the bottom structure 9 in a rapid manner since the row R of antenna elements 2 as shown in FIG. 2 is one single component. As shown in FIG. 2, there is an intermediary portion 19 between each adjacent antenna element 2. The intermediary portion 19 is manufactured such that a common row R of antenna elements 2 can be divided e.g. by cutting into separate individual antenna elements 2 or so a common integral row R of antenna elements 2 can be divided into a plurality of rows R of antenna elements 2.

Further, FIG. 2 shows that each notch antenna element 2 forms a three-dimensional, 3D, metal structure having a length L along a first direction x, a width W, in a second direction y, and a thickness T in a third direction z. Also, the first, second and third directions x, y, z are orthogonal to each other. Accordingly, the antenna elements 2 shown in FIGS. 1-3 are essentially planar antenna elements 2. The planar structure of the antenna elements 2 as shown in FIGS. 1-3 allows for manufacturing by cutting methods such as water cutting or laser. Accordingly, such methods result in a manufacturing that is faster, more environmental friendly, saves raw material, and does not workload materials compared to conventional methods such as milling.

Referring now to FIG. 1, the bottom plane 9 may comprises a first surface 9' having a recess 13 extending along the second direction y, the recess 13 being arranged to receive a row R of the plurality of notch antenna elements 2. The recess may be arranged to receive a row R of notch antenna elements 2 with a common integral base portion 3 or the recess may be arranged to receive a row R of notch antenna elements 2 with separate base portions 3.

FIG. 3 illustrates an objective view from the second surface 5 of a row of antenna elements 2. As shown in FIG. 3, the base portion 3 comprises a through hole via 12 which the feed point 11 is accessible. Further, it is shown in FIG. 3 that the feed point 11 is located at the leg portion 10, which combined with the through hole via 12 allows for convenient feeding of the feed point 11 so to emit RF waves from the tapering gap 8. The location of the feed point 11 results in that there is no need for complicated feeding arrangements.

As seen in the FIGS. 1-4*b*, each of the first and second electrically conductive bodies 6, 7 may comprise a circumferentially enclosed cavity 14 at an interior portion. However according to some embodiments, the 3D metal structure may be a solid metal structure (not shown).

Figure 4A:
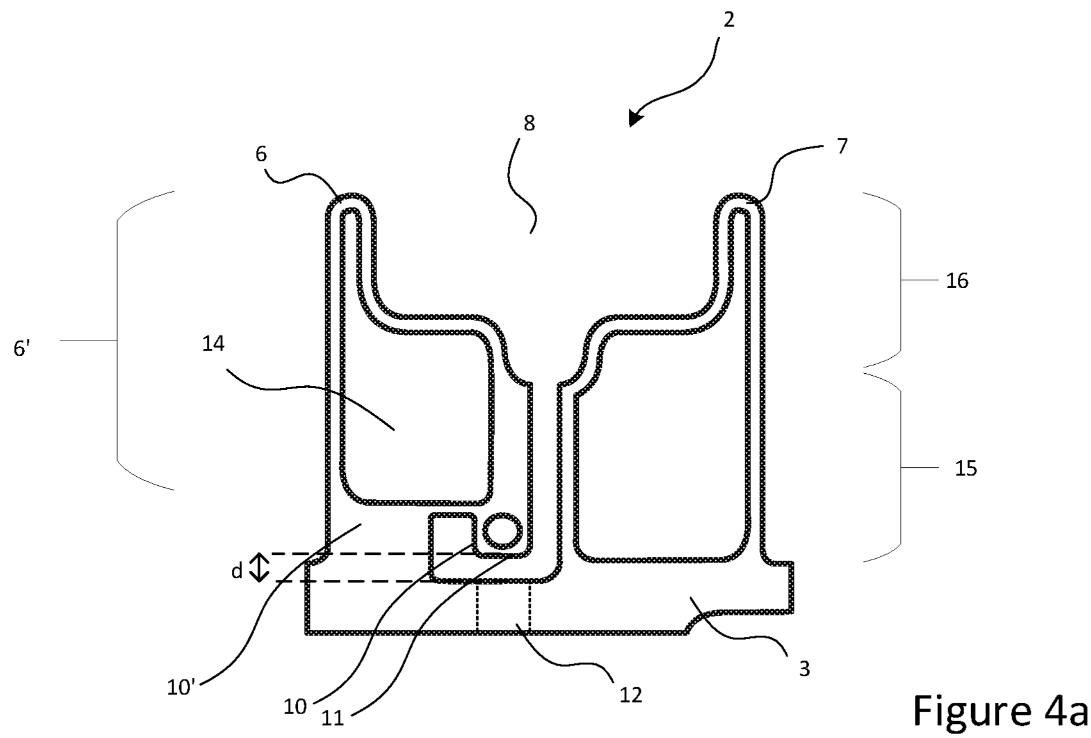
FIG. 4*a* illustrates an antenna element in accordance with an embodiment of the disclosure
Figure 4B:
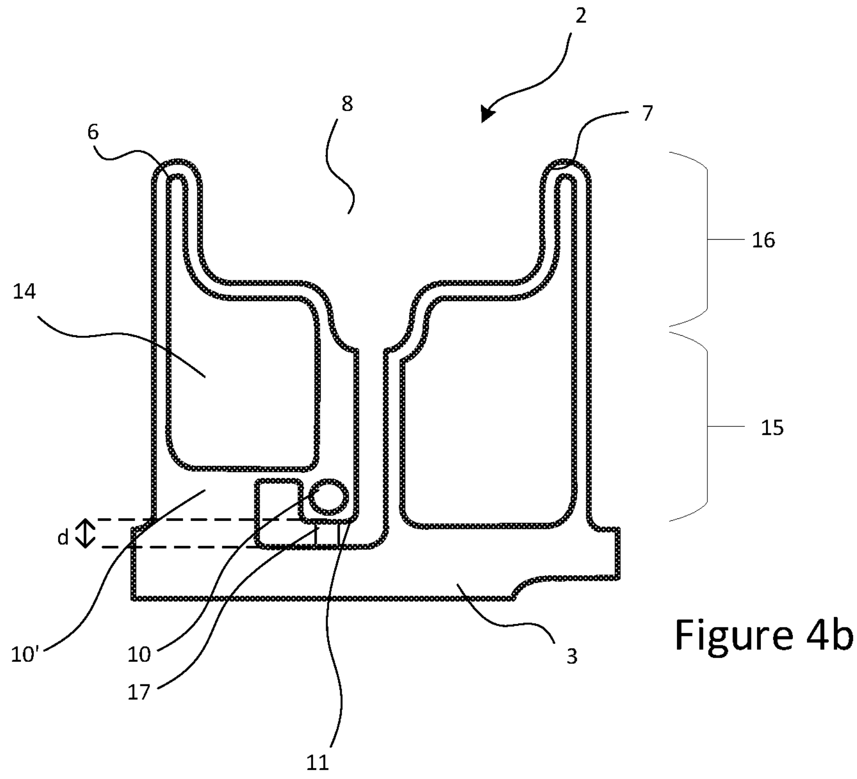
FIG. 4*b* illustrates an antenna element comprising a connector in accordance with an embodiment of the disclosure FIG. 5 schematically illustrates a vehicle comprising the notch antenna structure in accordance with an embodiment of the disclosure

FIGS. 4*a* and 4*b* illustrates a single antenna element 2 from a side view. As illustrated in FIG. 4, the leg portion 10 is a first leg portion and wherein the first electrically conductive body 6 comprises a second leg portion 10' integral with the first surface 4 of the base portion 3, and wherein the first leg portion 10 is separated from the base portion 3 by a defined distance d. Accordingly, as seen in the FIGS. 1-4*b*, each of the first and second electrically conductive bodies 6, 7 extend from a lower portion 15 to a tapered upper portion 16, and the cavity 14 follow an outer contour of at least the tapered upper portion 16 of each of the conductive bodies 6, 7. This allows for a lower weight of the notch antenna structure 1. However, the cavity 14 may generally follow the outer contour of both the upper and the lower portion 15, 16 of the antenna element 2.

The design of the leg portion 10 allows for a flexible feeding arrangement. The feed arrangement of each antenna element may comprise a connector 17 connected to the leg portion 10. Also, the connector may be integral with the leg portion 10 as shown in FIG. 4*b*. Further, according to some embodiments, the feed arrangement may comprise an open ended transmission line essentially λ/4 away from the feed point 11 (not shown). Further, according to some embodiments, the feed arrangement may comprise capacitive coupling (not shown). The connector 17 may be a coaxial connector.

There is seen in FIG. 4*b* that the first electrically conductive body 6 comprises a leg portion 10 having a connector 17 proximate to the tapering gap 8, the feed arrangement comprising a feed point. Thus, the leg portion 10 extend in the same direction as the connector and is adjacent to the gap in-between the first and the second electrically conductive body 6, 7. In the FIGS. 4*a* and 4*b*, the first electrically conductive body 6 also has a second leg portion 10' being integral with the base portion 3 of the antenna element 2. In other words, the first electrically conductive body 6 comprise a main body portion 6' where two leg portions 10', 10 extend from the bottom of the main body portion 6'. The first leg portion 10 having a distance d to the base portion 3 and the second leg portion 10' being integral with the base portion 3.

Thus, the connection with the feed point of each antenna element located at the leg portion of the antenna element 2 results in a less complicated feed arrangement. Thus, the notch antenna structure 1 according to the present disclosure provide an improved and more flexible feeding interface and a design that is more efficiently arranged to manufacture and assemble a large number of antenna elements 2.

As shown in the FIGS. 1-4*b*, the tapering gap 8 is a step-wise tapering gap. However, according to some embodiments the tapering gap 8 is a continuously tapering gap 8.

Figure 5:
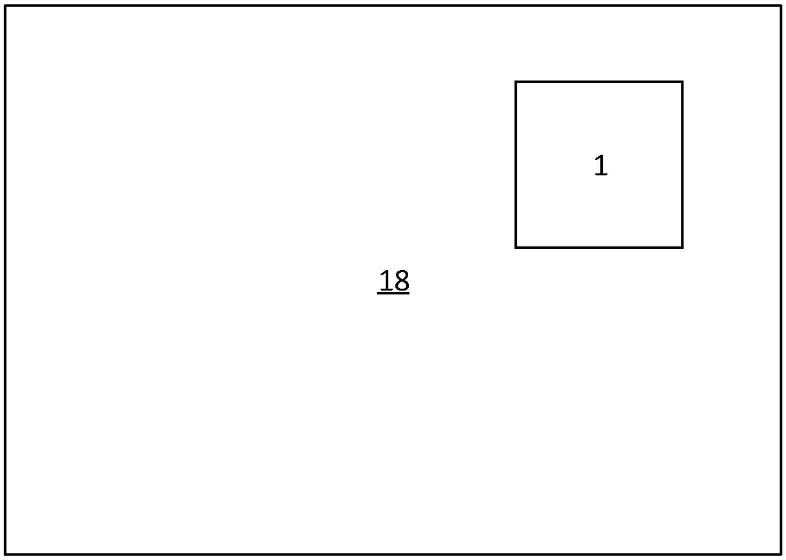

FIG. 5 illustrates a vehicle 18 comprising the notch antenna structure 1 according to the present disclosure.

The invention claimed is:

1. A notch antenna structure comprising:
- a plurality of notch antenna elements arranged in at least a first row (R), each notch antenna element comprising:
  - a base portion having a first surface and a second surface, wherein the first surface and the second surface is opposite to each other;
  - a first electrically conductive body and an adjacent second electrically conductive body, the electrically conductive bodies extending vertically from the first surface, forming an integral structure;
  - a tapering gap between the two electrically conductive bodies;
- wherein the notch antenna structure comprises a bottom plane for receiving the second surface of the plurality of notch antenna elements;
- wherein the first electrically conductive body comprises a leg portion having a feed arrangement proximate to the tapering gap, the feed arrangement comprising a feed point, and
- wherein each notch antenna element is joined at the base portion to at least one other notch antenna element so to form a common integral row of notch antenna elements.

2. The notch antenna structure according to claim 1, wherein the base portion comprises a through hole through which the feed point is accessible.

3. The notch antenna structure according to claim 1, wherein the leg portion is a first leg portion and wherein the first electrically conductive body comprises a second leg portion integral with the first surface of the base portion, and wherein the first leg portion is separated from the base portion by a distance (d).

4. The notch antenna structure according to claim 1, wherein each of the first and second electrically conductive bodies comprises a circumferentially enclosed cavity at an interior portion.

5. The notch antenna structure according to claim 4, wherein each of the first and second electrically conductive bodies extend from a lower portion to a tapered upper portion, wherein the cavity follow an outer contour of at least the tapered upper portion of each of the conductive bodies.

6. The notch antenna structure according to claim 1, wherein the feed arrangement comprises a connector integral with the leg portion.

7. The notch antenna structure according to claim 6, wherein the connector is a coaxial connector.

8. The notch antenna structure according to claim 1, wherein the tapering gap is a step-wise tapering gap.

9. The notch antenna structure according to claim 1, wherein the tapering gap is a continuously tapering gap.

10. A vehicle comprising a notch antenna structure according to claim 1.

11. A notch antenna structure comprising:
- a plurality of notch antenna elements arranged in at least a first row (R), each notch antenna element comprising:
  - a base portion having first surface and a second surface, wherein the first surface and the second surface is opposite to each other;
  - a first electrically conductive body and an adjacent second electrically conductive body, the electrically conductive bodies extending vertically from the first surface, forming an integral structure;
  - a tapering gap between the two electrically conductive bodies;
- wherein the notch antenna structure comprises a bottom plane for receiving the second surface of the plurality of notch antenna elements;
- wherein the first electrically conductive body comprises a leg portion having a feed arrangement proximate to the tapering gap, the feed arrangement comprising a feed point;
- wherein each notch antenna element forms a three-dimensional (3D) metal structure having a length (L) along a first direction (x), a width (W) in a second direction (y), and a thickness (T) in a third direction (z);
- wherein the first, second and third directions (x, y, z) are orthogonal to each other; and wherein the bottom plane comprises a first surface having a recess extending along the second direction (y), the recess arranged to receive a row (R) of the plurality of notch antenna elements.

12. The notch antenna structure according to claim 11, wherein the 3D metal structure is a solid metal structure.

* * * * *